United States Patent

Buckley et al.

[11] Patent Number: 5,002,117
[45] Date of Patent: Mar. 26, 1991

[54] MOTOR VEHICLE POWER STEERING COOLER ARRANGEMENT

[75] Inventors: Thomas J. Buckley, Saginaw, Mich.; Benigno Cruz, Eloy, Ariz.

[73] Assignee: General Motors Corporation, Detroit, Mich.

[21] Appl. No.: 503,358

[22] Filed: Apr. 2, 1990

[51] Int. Cl.⁵ .............................................. B60R 16/08
[52] U.S. Cl. ...................................... 165/44; 165/916; 60/456; 60/912; 184/104.1; 180/68.4; 180/79
[58] Field of Search .................... 60/456, 912; 165/41, 165/44, 916; 184/104.1; 180/68.4, 79

[56] References Cited

U.S. PATENT DOCUMENTS

| | | | |
|---|---|---|---|
| 657,684 | 9/1900 | Vorreiter | 165/41 |
| 1,401,562 | 12/1921 | Searles | 165/41 |
| 3,478,648 | 11/1969 | D'Alba | 60/912 |
| 3,770,049 | 11/1973 | Wright | 165/41 |

FOREIGN PATENT DOCUMENTS

| | | | |
|---|---|---|---|
| 569546 | 4/1924 | France | 180/68.4 |
| 118529 | 7/1984 | Japan | 180/68.4 |

Primary Examiner—John Ford
Attorney, Agent, or Firm—R. L. Phillips

[57] ABSTRACT

A motor vehicle power steering installation has a heat exchanger mounted in a hollow portion of a motor vehicle frame where air passes through at a velocity higher than that outside the motor vehicle frame.

2 Claims, 1 Drawing Sheet

MOTOR VEHICLE POWER STEERING COOLER ARRANGEMENT

Technical Field

This invention relates to cooling of the hydraulic fluid pumped by a motor vehicle power steering pump and more particularly to the arrangement and type of heat exchanger dedicated thereto.

BACKGROUND OF THE INVENTION

In power steering applications, such as used in trucks and buses as shown in FIG. 1, a power steering gear 10 mounted on the vehicle's frame 12 is powered by hydraulic fluid that is circulated by an engine driven power steering pump 14 and is typically cooled by a finned heat exchanger 16. The heat exchanger 16, which is also called a power steering cooler, typically comprises a U-shaped tube 18 to which a plurality of fins 20 are attached and is normally mounted in the air stream through the vehicle's engine compartment such as on a radiator support frame 22 ahead of the radiator (not shown). Further, by way of background, the truck or bus frame 12 is typically tubular and has a hollow section or portion 23 that terminates at its forward end in the vicinity of the power steering installation; in this case, immediately ahead of the radiator support frame. Furthermore, it is important to understand that the forward end of the hollow frame portion 23 is normally open and in the air stream that flows into and around the engine compartment.

SUMMARY OF THE INVENTION

In arriving at the present invention, it was discovered that the air velocity inside such a normally existing forwardly located hollow frame portion is approximately three times the air velocity outside the frame due to a vortex effect. The present invention takes advantage of this finding by locating the power steering cooler inside this normally existing hollow frame section thereby resulting in significantly greater heat transfer than is possible in the normal cooler location. And as a further result of this increased flow effect, it was discovered that it was then possible to eliminate the fins from the cooler and simply employ a bare U-shaped or serpentine shaped cooler tube circuit to obtain the required performance. Furthermore, by locating the power steering cooler inside the frame, there is provided protection for the power steering cooler from road hazards, off-road hazards and corrosive elements. In addition, this improved location further prevents mud build-up on the power steering cooler which can degrade its cooling effectiveness.

It is therefore an object of the present invention to provide a new and improved motor vehicle power steering cooler arrangement that is more cost effective than those currently employed.

Another object is to provide in a heavy duty power steering application for a motor vehicle a power steering cooler that is mounted in a normally existing vehicle structure in which there normally flows air at a velocity in excess of the normal air flow in the engine compartment.

Another object is to provide in a motor vehicle having an engine supporting frame including a hollow portion through which air normally passes on forward vehicle motion, a power steering pump having a heat exchanger therefor of preferably bare serpentine tube design mounted in the hollow frame portion for cooling the hydraulic fluid circulated by the power steering pump.

These and other objects, advantages and features of the present invention will become more apparent from the following description and drawing in which:

DETAILED DESCRIPTION OF THE DRAWINGS

Figure 1:
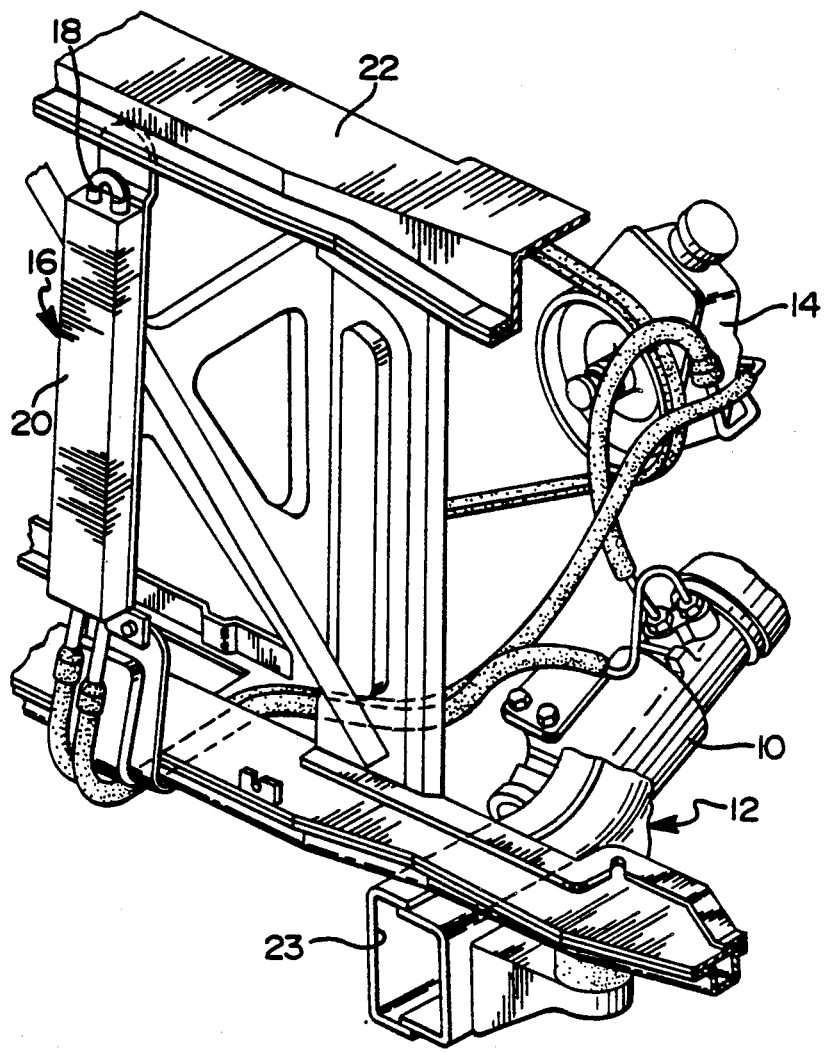
FIG. 1 is a three dimensional illustration of a prior art motor vehicle power steering installation.
Figure 2:
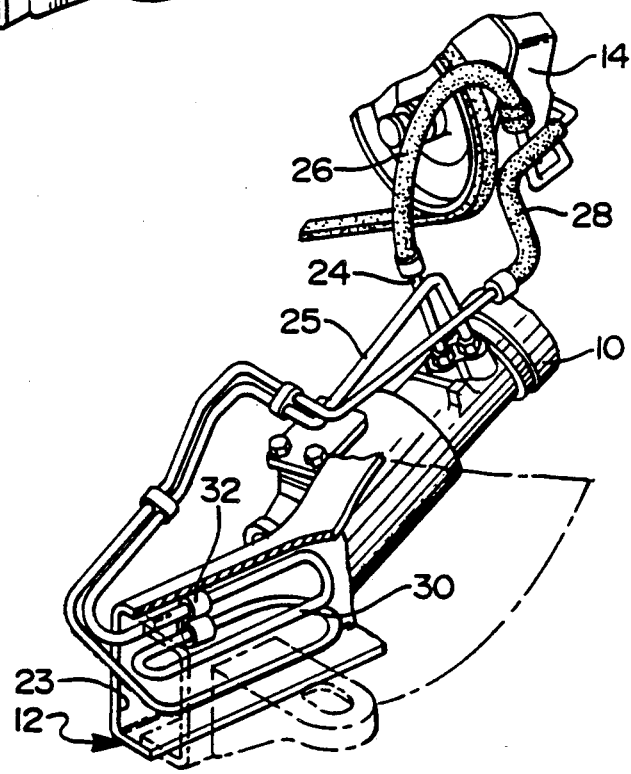
FIG. 2 is a three dimensional view after the manner of FIG. 1 showing the power steering installation according to the present invention.

Referring to FIG. 2 wherein parts corresponding to those in FIG. 1 are identified by the same numbers, the power steering gear 10 is connected with the power steering pump 14 by rigid tubes 24 and 25 made of metal or other suitable material and by flexible lines 26 and 28, respectively. According to the present invention, the tube 25 which returns the fluid from the steering gear back to the pump is made much longer than the delivery tube 24 and is bent into a serpentine configuration 30 to form a power steering cooler that is mounted by a clip 32 within the hollow frame rail box portion 23 of the vehicle frame 12. As a result, the serpentine tube cooler 30 is located in a position where the flow velocity is significantly greater (approximately three times greater) than that outside the frame because of the vortex effect previously mentioned, thus resulting in a more effective power steering cooler than would be possible if located outside the frame. This increase in heat transfer effectiveness is sufficient to the extent that fins such as those employed in the prior art heat exchanger 16 of FIG. 1 can be eliminated as shown. Moreover, it will be seen that only the necessary lines leading to the serpentine cooling portion are exposed to the elements and the serpentine wound portion that primarily effects the cooling is located inside the frame safe from road hazards, off-road hazards and corrosive elements. Moreover, the frame portion 23 effectively prevents mud build-up on this critical portion of the oil cooler circuit.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principals of the invention and its practical application to thereby enable one of ordinary skill in the art to utilize the are within the scope of the invention as determined by the appended claims when interpreted in accordance with the breadth to which they are fairly, legally and equitably entitled.

The embodiments of the invention in which an exclusive property or privilege is claimed are defined as follows:

1. In combination, a motor vehicle having an engine supporting frame including a hollow portion that is open at opposite ends thereof and through which air normally passes on forward vehicle motion, a power steering pump for pumping hydraulic fluid to effect power steering of the vehicle, and a serpentine tube heat exchanger extending into and out of one open end only of said hollow frame portion for cooling said hydraulic fluid.

2. In combination, a motor vehicle having an engine supporting frame including a hollow portion that is open at opposite ends thereof and through which air normally passes on forward vehicle motion, a power steering pump for pumping hydraulic fluid to effect power steering of the vehicle, and a bare serpentine tube heat exchanger extending into and out of one open end only of said hollow frame portion for cooling said hydraulic fluid.

* * * * *